(No Model.)

G. VALLEY.
TROLLEY POLE STAND.

No. 513,847. Patented Jan. 30, 1894.

WITNESSES:
J. M. Lynch
H. C. Pitcher

Gustaf Valley, INVENTOR

BY
Geo. W. King,
ATTORNEY.

THE NATIONAL LITHOGRAPHING COMPANY,
WASHINGTON, D. C.

UNITED STATES PATENT OFFICE.

GUSTAF VALLEY, OF CLEVELAND, OHIO, ASSIGNOR TO THE STEEL MOTOR COMPANY, OF SAME PLACE.

TROLLEY-POLE STAND.

SPECIFICATION forming part of Letters Patent No. 513,847, dated January 30, 1894.

Application filed May 11, 1893. Serial No. 473,889. (No model.)

*To all whom it may concern:*

Be it known that I, GUSTAF VALLEY, of Cleveland, in the county of Cuyahoga and State of Ohio, have invented certain new and useful Improvements in Trolley-Pole Stands; and I do hereby declare the following to be a full, clear, and exact description of the invention, such as will enable others skilled in the art to which it pertains to make and use the same.

My invention relates to improvements in trolley pole stands for electric street cars, and it consists in certain features of construction, and in combination of parts hereinafter described and pointed out in the claim.

Figure 1:
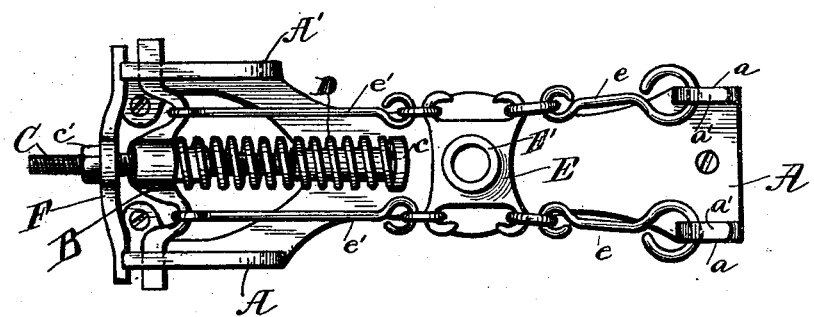
Figure 2:
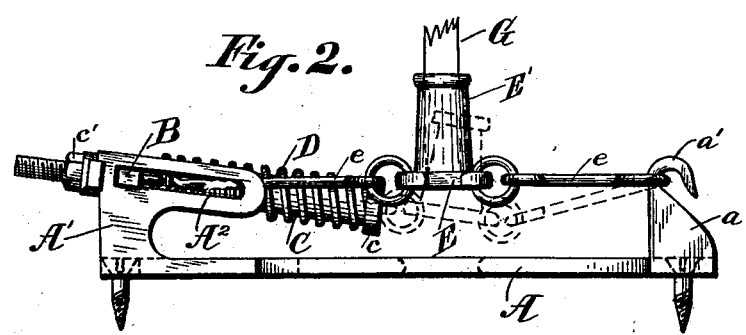

In the accompanying drawings: Figure 1 is the plan of a trolley pole stand embodying my invention. Fig. 2 is a side elevation of the same.

A, represents a base plate that is supposed to be fastened to the deck or car top. This plate at the one end thereof, has upwardly projecting ears $a$ $a$, these ears terminating in hooks as at $a'$ $a'$. The other end of plate A, is provided with upwardly projecting flanges $A'$ $A'$, and these flanges are slotted as at $A^2$, these slots serving as ways for the cross-head B. This cross-head has a central hole extending laterally thereof, in which hole operates the tension pin C, for the coiled spring D. The inner end of pin C has a head $c$, this head engaging and serving as a seat for the inner end of spring D. The other end of spring D engages the cross-head. The outer end of pin C, extends with an easy fit through a hole in cross-bar F, the end portions of this cross-bar engaging seats or notches in the opposing ends of flanges $A'$ $A'$. The outer end of pin C is screw-threaded and has a nut $c'$, this nut engaging the outer side of cross-bar F. By tightening this nut any desired tension is imparted to spring D.

E is a metal plate, known as the trolley plate and having a centrally located upwardly projecting socket $E'$, in which socket the butt of the trolley pole G is secured. Plate E is suspended from the corners thereof by means of links $e$ $e$ and $e'$ $e'$, links $e$ $e$ engaging hooks $a'$ $a'$ aforesaid, and links $e'$ $e'$ engaging the cross-head substantially as shown more clearly in Fig. 1. The tension of spring D acting outward on the cross-head tends to hold socket $E'$ normally upright, as shown in solid lines, Fig. 2. The socket and attached trolley pole have a case universal movement that admits of tilting the trolley pole in any direction, and at any tilting of the trolley pole in any direction from the perpendicular compression spring D, the recoil of the spring will tend to return the trolley pole to an upright position. Hence it follows that the trolley will engage and travel on the over-head wire with equal facility whether or not the wire be located centrally over the car tracks. This is a matter of importance as it is not an easy matter to always keep the wire central over the track, especially at curves of the track. Whenever from long use or otherwise spring D loses more or less of its tension, additional tension can be given the spring by tightening nut $c'$, and this can be done while the trolley is at work.

In dotted lines Fig. 2 is shown approximately the position of parts with the trolley pole tilted toward the right hand.

What I claim is—

In combination a base plate for attaching to the car top, a trolley pole plate bearing a socket for engaging the trolley pole, such trolley pole plate being suspended by means of links, the links from the one side thereof engaging hooks or opposing members of the base plate, the links from the other side of the trolley pole plate engaging a cross-head, a coiled spring connected with and acting on the cross-head in the direction to hold the links taut, substantially as and for the purpose set forth.

In testimony whereof I have signed this specification, in the presence of two witnesses, this 2d of May, 1893.

GUSTAF VALLEY.

Witnesses:
G. P. NASH,
D. W. AYLWORTH.